United States Patent Office 3,592,604
Patented July 13, 1971

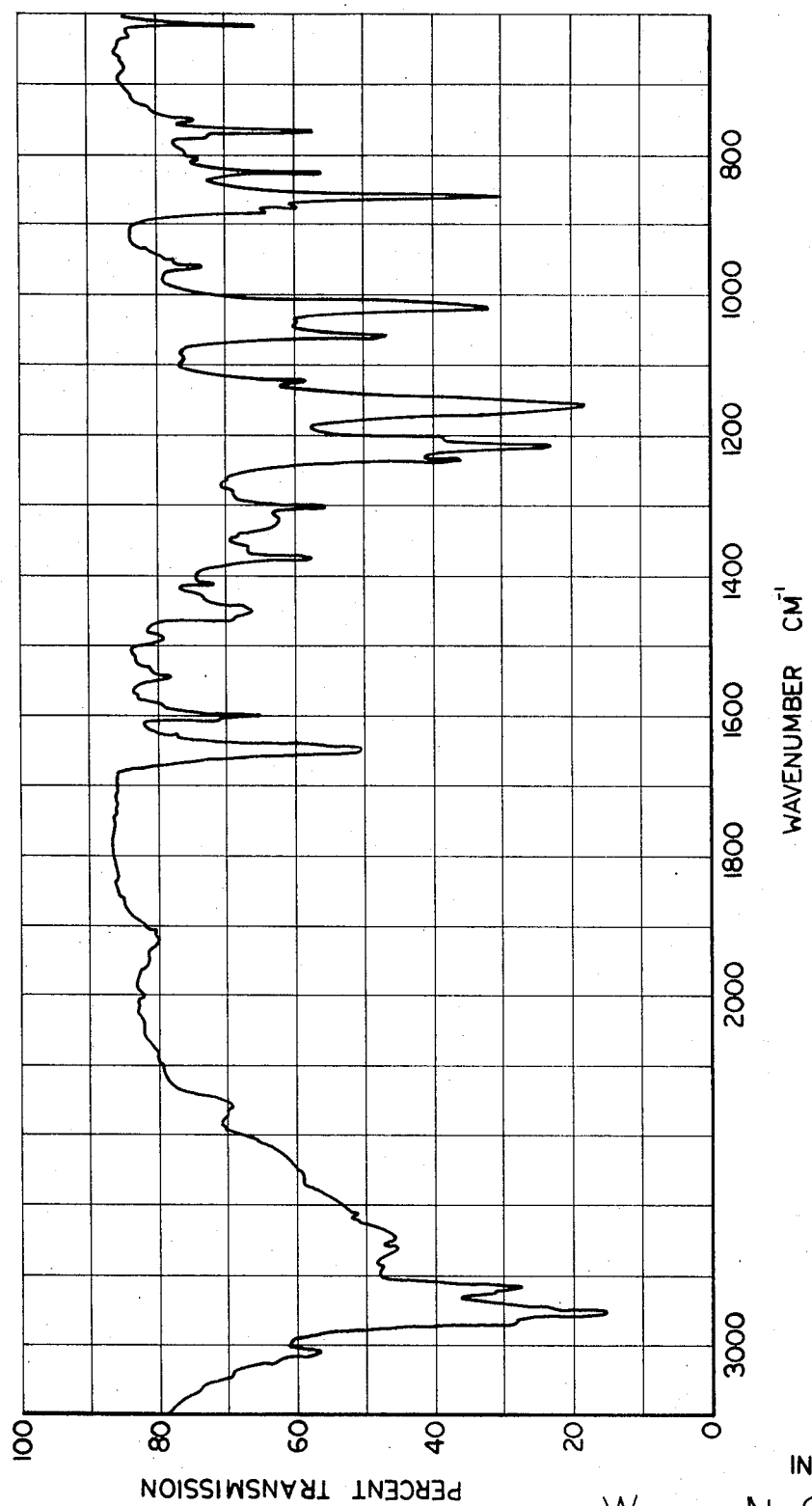

3,592,604
2-(p-DIMETHYLAMINO STYRYL) - 1 - METHYL-QUINOLINIUM CHLORIDE AS AN ANALYZER FOR IODINE
William N. Cottrell, Jr., Indianapolis, Ind., assignor to Bio-Dynamics, Inc., Indianapolis, Ind.
Filed Jan. 23, 1969, Ser. No. 793,334
Int. Cl. G01n 33/16, 21/06
U.S. Cl. 23—230                                                  5 Claims

ABSTRACT OF THE DISCLOSURE 2-(p-dimethylamino styryl)-1-methylquinolinium chloride which is produced by the reaction of quinaldine, methylene chloride and p-dimethylamino benzaldehyde in the presence of ethyl alcohol and sulfuric acid. This compound is used as an indicator for inorganic and organic bound iodine in body fluids.

BACKGROUND OF THE INVENTION

Quinoline compounds and derivatives thereof are known in the prior art for usage in such diverse fields as dyes, pigments, chemotherapeutic agents, medicinal products, etc. This invention is a specific quinoline derivative which can be advantageously used as a chemotherapeutic agent and as a test indicator for iodine in body fluids.

FIELD OF THE INVENTION

This invention is concerned with a quinoline derivative. This invention also relates to a method for killing bacteria and a method for quantitatively indicating the presence of iodine in body fluids.

SUMMARY OF THE INVENTION

This invention is concerned with a chemical compound namely 2-(p-dimethylamino styryl)-1-methylquinolinium chloride. The compound of this invention is produced by the reaction of quinaldine, methylene chloride and p-dimethylamino benzaldehyde in the presence of ethyl alcohol and sulfuric acid. 2-(p-dimethylamino styryl)-1-methylquinolinium chloride is useful as a chemotherapeutic agent and as an indicator for inorganically and organically bound iodine in body fluids.

The primary object of this invention is 2-(p-dimethylamino styryl)-1-methylquinolinium chloride.

Another object of this invention is a bactericide for destroying bacteria which comprises contacting bacteria with 2-(p-dimethylamino styryl)-1-methylquinolinium chloride.

Still another object of this invention is a quantitative and qualitative test for the determination of iodine in body fluids.

Finally the objects of this invention include all the other novel features which will be obvious from the specification and claims at hand.

DESCRIPTION OF THE PREFERRED EMBODIMENT

As is stated above this invention is concerned with a chemical compound namely 2-(p-dimethylamino styryl)-1-methylquinolinium chloride. The compound of this invention has definite chemotherapeutic properties and it is useful as an indicator for inorganic and organic bound iodine in body fluids.

Generally, it could be stated that the chemical compound of this invention is produced by the reaction of quinaldine, methylene chloride and p-dimethylamino benzaldehyde in the presence of ethyl alcohol and sulfuric acid.

More specifically, 2-(p-dimethylamino styryl)-1-methylquinolinium chloride of this invention is produced by the reaction of from about .5 to about 1.5 moles of quinaldine with about .5 to about 1.5 moles of methylene chloride and from about .5 to about 1.5 moles of p-dimethylamino benzaldehyde.

The reaction is carried out in a reaction medium of ethyl alcohol. Sufficient ethyl alcohol is present in order to effect the complete solution of the reactants. Generally sufficient ethyl alcohol is present such that the reactants comprise from about 10 to about 30 percent solution in ethyl alcohol.

The reaction whereby the subject compound is produced is carried out in a strongly acidic medium. The reaction pH for use in accordance with this invention is on the order of from about .1 to about 3. This low pH reaction medium is produced by adding a sufficient quantity of sulfuric acid to the other reactants in order to achieve the desired pH.

The reaction whereby the compound of this invention is produced is carried out at a temperature of from about 10 to about 50° C. A good range for the operating temperature is from about 20 to about 30° C., and the preferred operating temperature being 25° C.

The reaction of this invention is carried out for a period of time from about 10 to about 40 minutes, a good range for the reaction time is from about 15 to about 30 minutes, and the preferred reaction time is 20 times.

The reaction of this invention proceeds in accordance with Equation 1 as set forth below. The reaction is carried out with constant stirring, in the presence of sulfuric acid which tends to create low heat.

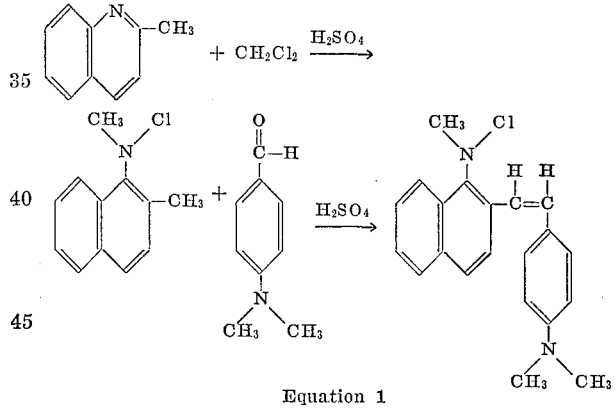

Equation 1

The preferred reaction for the preparation of the compound of this invention comprises the reaction of 10 ml. of quinaldine with 10 ml. of methylene chloride (C.P. grade) and 1 gm. of p-dimethylamino benzaldehyde in a solvent made by mixing 210 ml. of absolute ethyl alcohol with 10 ml. of concentrated sulfuric acid. This preferred reaction is carried out at 20° C. for a period of time of 20 minutes. Upon completion of the reaction pure 2-(p-dimethylamino styryl)-1-methylquinolinium chloride is separated from the reaction mixture, and washed several times in 100% ethyl alcohol.

The chemical compound of this invention has a structural formula as is defined in Formula 1.

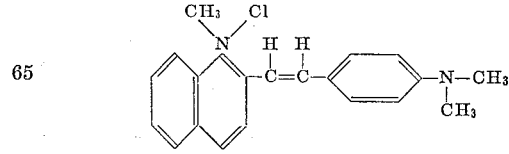

Formula 1

The chemical compound of this invention is defined more particularly by the infrared spectrograph which is illustrated in the figure as was run in an oil mull. It is to be noted that the infrared spectrograph as is illustrated in the figure has a peak at 1655 cm.$^{-1}$ which is indicative of

functional group, a peak at 1635 cm.$^{-1}$ which is indicative of the conjugated

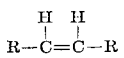

functional group, peaks at 965 cm.$^{-1}$ and 1310 cm.$^{-1}$ which are indicative of

trans substitution, a peak at 3040 cm.$^{-1}$ which is indicative of

peaks at 755, 1495 and 1500 cm.$^{-1}$ which indicate the presence of the chloride ion, peaks at 782, 830, 865 and 3020 cm.$^{-1}$ which are indicative of quinoline, and peaks at 1025, 1045, 1100, 1200, 1495 and 1550 cm.$^{-1}$ which are indicative of

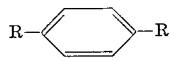

The chemical compound as defined by Formula 1 above and as descriebd by the infrared spectrograph of the figure, has bactericidal properties against gram positive and gram negative bacteria. for example, the compound exhibits specific bactericidal properties against B. diphtheriae. These bactericidal properties are effective when the compound of this invention is taken internally or when administered externally to warm blooded animals. As an example of an external usage, the physical properties of this compound lend its usage as a cosmetic base which in addition to being a cosmetic base has bactericidal properties.

In addition to the above specified chemotherapeutic properties, the compound of this invention is useful as a quantitative and qualitative indicator for organic or inorganic bound iodine in trace amounts on the order of 0–60 parts per million in body fluids. The methyl substituted compound of this invention is particularly advantageous as an indicator due to the fact that this lower alkyl substituent permits the easy exchange of the chloride ion for the iodide ion. The chloride salt of this invention is a colorless compound. However, when the chloride substituent is replaced by an iodine atom, the compound turns bright red and absorbs strongly in the range of from about 515 to about 550 m$\mu$.

The following examples will illustrate the subject invention. These examples are given for the purpose of illustration and not for purposes of limiting this invention. (All parts percent are given by weight unless otherwise specified.)

EXAMPLE I

The chemical compound of this invention was prepared by placing 200 ml. of 95% ethanol (Formula 3a) in a 500 ml. beaker. To this ethanol was slowly added 10 ml. of quinaldine (C.P. grade) and 10 ml. of methylene chloride with stirring. To this mixture was slowly added approximately 1 gram of p-dimethylamino benzaldehyde (C. P. grade). To this composite mixture was slowly added 10 ml. of 98% sulfuric acid. The sulfuric acid was added to the mixture with constant stirring. The resulting mixture was agitated constantly under a hood for approximately 20 minutes during which time a precipitate was formed. The precipitate was then filtered from the solution using Watman No. 4 filter paper, washed completely with ethanol three times, dryed and stored in dry atmosphere. Analytical techniques were used to determine that the compound produced by this reaction sequence was 2-(p-dimethylamino styryl)-1-methylquinolinium chloride.

EXAMPLE II

A reagent was prepared from the compound as produced in accordance with Example I by dissolving 1 gram of said compound in 700 ml. of distilled water. The pH of this solution was then adjusted to 2.75 with sulfuric acid. The resulting solution was then diluted to 1 liter with distilled water. 3 ml. of this test solution was then added to a small test tube. To this 3 ml. was added 1 ml. of blood serum having a known iodine content. The resulting composite solution was incubated for 20 minutes at 37° C. During that period of time the solution turned bright red indicating the presence of iodine. A colorimetric determination was then made in the region of 535 m$\mu$ using Coleman Colormeter Model 124 as produced by Coleman Instrument Co. This determination indicated the presence of 5 micromoles of iodine per ml. in the known. This is to be compared with the known iodine concentration of 5 micromoles of iodine per ml.

EXAMPLE III

A stock buffered solution of potassium periodate was prepared by the addition of 168.6 grams of potassium periodate to a liter of distilled water which was buffered to a pH of 7.4 with a potassium-sodium phosphate buffer. This produced a 100 micromole per ml. stock solution. 3 ml. of the reagent of Example II using the test procedure of Example II was added to 1 ml. a solution which was prepared by diluting 2 ml. of stock solution to 100 ml. The solution turned bright red and a colorimetric determination in the region of 535 m$\mu$ indicated a concentration of iodine of 2 micromoles per ml. which was the concentration of the diluted stock solution.

As can be seen from these results the compound of this invention is capable of being used as an accurate indicator for the presence of iodine in body fluids and standard solutions.

What is claimed is:

1. A proces for the qualitative and quantitative determination of iodine in a body fluid which comprises adding to said body fluid a specified amount of 2-(p-dimethylamino styryl)-1-methylquinolinium chloride and determining the color change at from about 515 to about 550 m$\mu$.

2. A process for the qualitative and quantitative determination of iodine in a body fluid which comprises the steps of:
   (a) adding to such body fluid at least enough-2-(p-dimethylamino styryl)-1-methylquinolinium chloride to bring about a maximum optical density at wavelengths from about 515 to about 550 m$\mu$.
   (b) and determining the change in optical density of the fluid at wavelengths from about 515 to about 550 m$\mu$.

3. The process of claim 2 wherein the body fluid is blood serum.

4. The process of claim 2 wherein the optical bandwidth considered is from about 525 to about 540 m$\mu$.

5. The process of claim 2 including the additional step of incubating the body fluid at a temperature of about 37° C. after said adding and before said determining.

References Cited

Sharefkin et al., "Qualitative Detection of Iodine in Organic Compounds," Analytical Chemistry, vol. 32, No. 8, July 1960, pp. 996–998.

MORRIS O. WOLK, Primary Examiner

R. E. SERWIN, Assistant Examiner

U.S. Cl. X.R.

252—408